United States Patent [19]
Abel et al.

[11] Patent Number: 5,740,048
[45] Date of Patent: Apr. 14, 1998

[54] METHOD AND APPARATUS FOR GPS POSITIONING, FILTERING AND INTEGRATION

[76] Inventors: Jonathan S. Abel, 184 Tennyson Ave., Palo Alto, Calif. 94301; James W. Chaffee, P.O. Box 4613, Austin, Tex. 78765

[21] Appl. No.: 927,936

[22] Filed: Aug. 7, 1992

[51] Int. Cl.$^6$ ............................................. G01C 23/00
[52] U.S. Cl. .................................. 364/443; 364/449.7
[58] Field of Search .......................... 364/449, 452, 364/453, 454, 449.7; 342/357, 458, 352; 375/81

[56] References Cited

U.S. PATENT DOCUMENTS

| | | | |
|---|---|---|---|
| 4,232,313 | 11/1980 | Fleishman | 364/452 |
| 4,589,610 | 5/1986 | Schmidt | 244/3.19 |
| 4,646,096 | 2/1987 | Brown | 342/357 |
| 4,894,662 | 1/1990 | Counselman | 342/357 |
| 4,954,837 | 9/1990 | Baird et al. | 342/458 |
| 5,062,123 | 10/1991 | Geile et al. | 375/81 |
| 5,153,599 | 10/1992 | Harigae et al. | 342/352 |
| 5,184,304 | 2/1993 | Huddle | 364/453 |
| 5,202,829 | 4/1993 | Geier | 364/449 |
| 5,216,611 | 6/1993 | McElreath | 364/454 |

OTHER PUBLICATIONS

"Integrating GPS with Ranging Transponders," Abel et al., Proc. ION Natational Technical Meeting, published in written form Aug. 8, 1991 (10 pages).

"Sufficiency Data Reduction, and Sensor Fusion for GPS," Chafee et al., Proc. ION Nat'l Tech. Meeting, Jan. 1992 (7 pages).

"A Divide and Conquer Approach to Least–Squares Estimation," Abel, IEEE Trans. AES, vol. AES–26, No. 2, Mar. 1990 (12 pages).

"An Algebraic Solution of the GPS Equations," Bancroft, IEEE Transactions on Aerospace and Electronic Systems, vol. AES–21, No. 7, pp. 56–59, Jan. 1985.

The GPS Filtering Problem, James W. Chaffee and Jonathan S. Abel, Proc. IEEE Plans 92, Monterey, CA, Mar. 1992.

The Geometry of GPS Solutions, Jonathan S. Abel and James W. Chaffee, Proc. Inst. Nav. National Tech. Meeting, San Diego, CA, Jan. 1992.

Existence and Uniqueness of GPS Solutions, Jonathan S. Abel and James W. Chaffee, IEEE Trans. on Aerospace and Electronic Systems, vol. 27, No. 6 (Nov. 1991).

*Primary Examiner*—Kevin J. Teska
*Assistant Examiner*—S. Walder
*Attorney, Agent, or Firm*—Limbach & Limbach L.L.P.

[57] ABSTRACT

A method and apparatus for processing data from a positioning or navigation system, such as global positioning system (GPS) navigation system data. In preferred embodiments, the invention is a method and apparatus for estimating position based on GPS measurements and optionally, measurements from other types of navigation sensors combined with GPS navigation system data. The apparatus of the invention includes a point position estimator (which preferably approximates a maximum likelihood estimator) for processing data from a positioning or navigation system to generate point position estimate data, and a smoothing filter for smoothing the point position estimate data. The smoothing filter can be a linear Kalman filter.

32 Claims, 4 Drawing Sheets

METHOD AND APPARATUS FOR GPS POSITIONING, FILTERING AND INTEGRATION

FIELD OF THE INVENTION

This invention pertains to methods and apparatus for positioning and navigation, such as those which process GPS navigation system data. A preferred embodiment of the invention pertains to processing methods and apparatus for estimating position based on GPS measurements and, optionally, measurements derived from other navigation sensors.

BACKGROUND OF THE INVENTION

GPS (Global Positioning System) is a navigation system in which measurements called pseudoranges are processed to estimate a user's position. A simplified diagram of a GPS navigation system is illustrated in FIG. 0. There are a set of satellites 2 in 12-hour orbits about the earth. Each satellite maintains a clock and transmits a time-coded signal which includes satellite ephemerides. By comparing times of arrival (according to the user clock) of the satellite signals at a user apparatus 4 to their times of transmission (according to GPS time) and scaling by the propagation velocity, the slant range from the user to each visible satellite may be determined to within an additive constant. (This additive constant reflects any offset which might exist between the user's clock and GPS time, and is called user clock bias.) The range-like quantities so measured are referred to as pseudoranges, and may be processed via a so-called navigation filter to determine position.

The pseudorange measurements are nonlinear in position, and, as a consequence, linearization techniques are commonly employed for solution. Currently, GPS receivers estimate position either via an extended Kalman filter or via linearized least squares.

The inventors, however, have discovered that both of these methods have serious drawbacks, leading to inaccurate positioning and difficulties in integrating GPS with other navigation sensors. (See "The GPS Filtering Problem," in Proc. IEEE PLANS 92, Monterey, Calif., March 1992, and "Sufficiency, Data Reduction, and Sensor Fusion for GPS," in Proc. Inst. Nav. Nat'l Tech. Meeting, San Diego, Calif., January 1992, authored by the inventors; these papers are incorporated herein by reference.) Linearized least squares methods assume a stationary user, and are not appropriate for many GPS applications. Although it is not well known, the extended Kalman filter is, in fact, a suboptimal stochastic Gauss-Newton algorithm, and exhibits bias and convergence problems. Consistent with this notion is the common practice of tuning extended filters with a process noise much larger than is physically meaningful. Such a tuning is often required for filter convergence; the penalty paid is the loss of the ability to properly smooth the data. Finally, the extended Kalman filter requires an initial condition. Because the extended filter is not stable, a poor initialization can cause divergence. This behavior is particularly problematic in scenarios such as space vehicle tracking in which good initialization may not be available.

Regarding the combining of GPS with other navigation sensors, consider, for instance, integrating GPS and INS (Inertial Navigation Sensor) in a highly dynamic aircraft. If the prefiltered GPS positions are used as input to the integrating filter, the lag and time correlation induced by prefiltering will degrade the performance of the INS, thereby defeating the purpose of integration. When raw pseudoranges are used, the standard methods involve linearization, either about the INS solution or as an extended filter utilizing the sensed INS accelerations as a forcing function (or, equivalently, a control function). Both of these methods perform poorly as a result of the linearization.

SUMMARY OF THE INVENTION

The invention is a method and apparatus for determining position based on GPS measurements, and, optionally, for combining measurements from different navigation sensors with GPS.

The inventors have discovered that under certain conditions, a properly computed sequence of point estimates of position (computed from the input stream of pseudoranges) contains as much position information as is contained in the input pseudoranges themselves. (Refer again to "The GPS filtering problem," in Proc. IEEE PLANS 92, Monterey, Calif., March 1992.) This discovery suggests an alternative to standard filtering and integration methods, and forms the basis of the invention described herein.

The invention combines a point position estimator with a smoothing filter as shown in FIG. 1. Such an apparatus obviates the need for linearization, and the problems associated therewith. Note that the second-stage filter could simply smooth the sequence of GPS positions, or, as shown in FIG. 2, it could be used to fuse a variety of sensors, handling a changing configuration without perturbation. (This ability results from the linearity of the problem.)

The first basic innovation is the coupling of a point position estimate to a second-stage smoothing filter. In a class of preferred embodiments, the point position estimate approximates an unbiased minimum variance estimator, and the smoothing filter is a linear Kalman filter. Such an architecture provides a solution to the nonlinear GPS filtering problem without the need for linearizing the smoothing filter. This architecture also decouples, in a sense, the spatial and temporal aspects of the filtering problem, allowing for a more realistic and physically meaningful tuning than that provided by currently used methods such as the extended filter. It also provides a simple platform for integration.

The second innovation comes from our discovery that the character of the GPS solutions depends on the prior availability of user clock bias information. (See "The Geometry of GPS Solutions," in Proc. Inst. Nav. Nat'l Tech. Meeting, San Diego, Calif., January 1992, authored by the inventors; this paper is incorporated herein by reference.) If the clock is completely unknown at each solution point, GPS is a hyperbolic system, like LORAN, while if the clock is completely known, GPS is a ranging system. As a ranging system, GPS has more potential accuracy with the same data, since more information can be applied directly to the position fix. In a class of preferred embodiments, we use the Bayesian scheme to apply prior information on the clock bias to point estimation, so that if the prior information is independent of the pseudoranges, the point estimates are as independent as the stream of input pseudoranges. If the prior information on the clock bias is dependent on the pseudoranges through previous fixes, the resultant time correlation is in a known direction and can be accounted for. Needless to say, clock bias information may be incorporated as in FIG. 3 to improve the quality of the output of the navigation filters in FIGS. 1 and 2.

Additional information, useful for positioning and navigation, is often supplied by the GPS receiver or by external sources. In a class of embodiments, the navigation and smoothing filters of FIGS. 1 and 2 are modified to accommodate differential corrections, GPS range rates and other velocity-related measurements, and a priori knowledge of position-like components such as altitude.

The basic idea behind the invention—that of eliminating the need for a linearized filter by computing point position estimates—is well suited to other nonlinear positioning systems. In a class of embodiments, the two-stage approach of FIGS. 1 and 2 is modified for use when the GPS sensor is replaced by a position-producing sensor, such as a LORAN sensor, or a set of ranging transponders.

DETAILED DESCRIPTION OF THE PREFERRED EMBODIMENT

GPS Positioning and Filtering

Figure 0:
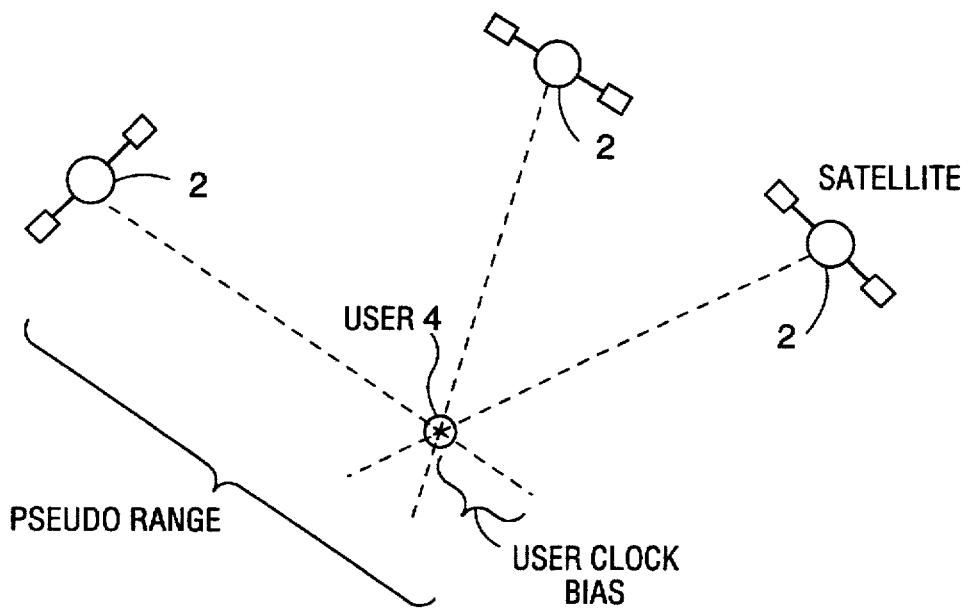
FIG. 0 is a schematic diagram of a GPS navigation system which provides GPS measurements to a user.

The invention will first be described with reference to FIG. 1. Antenna 10 receives GPS signal 11, which is processed in GPS sensor 12. Periodically appearing at the output of GPS sensor 12 are a set of measured pseudoranges—one pseudorange for each visible satellite—and a navigation message which includes satellite ephermerides. The navigation processor 14 converts the measurements 13 into estimates of position, and optionally, user clock bias—so-called point estimates. The navigation processor output 15 may also include estimates of the covariance of any output point estimate. Smoothing filter 16 processes the navigation processor output 15, resulting in a sequence of smoothed positions, and optionally other smoothed states such as velocity, acceleration, clock bias and clock drift 17.

It remains to specify navigation processor 14 and smoothing filter 16.

Navigation Processor

Figure 4:
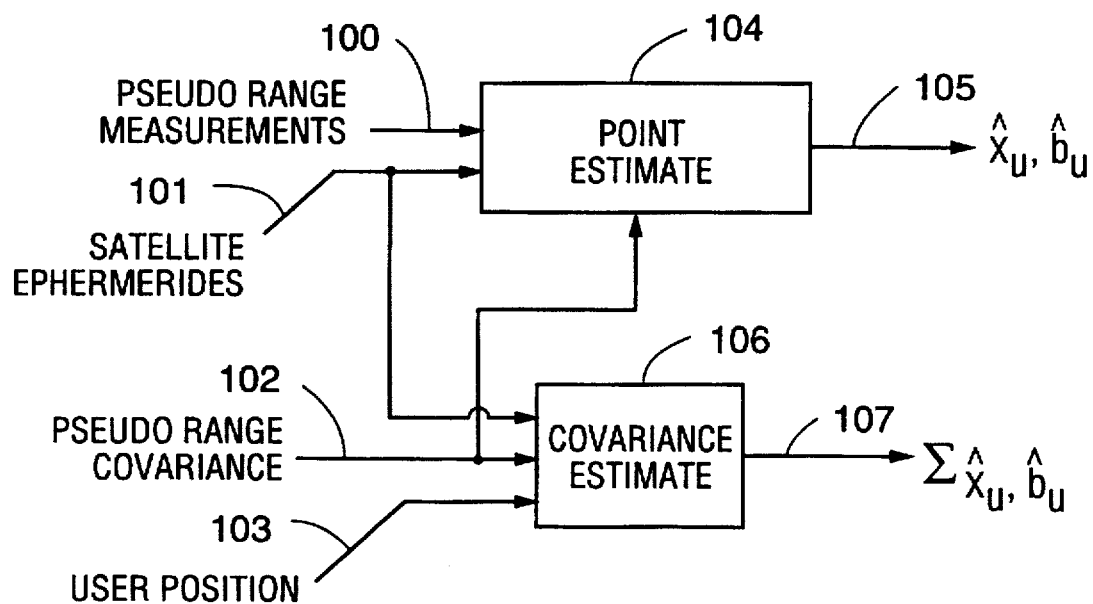
FIG. 4 is a block diagram of a navigation processor which can be employed in the inventive apparatus.

The navigation processor 14 consists of the two functional blocks shown in FIG. 4. The point estimate 104 takes as input raw pseudoranges 100 and satellite positions 101 and an estimate of the pseudorange covariance 102. It outputs estimates of user position and/or user clock bias 105. The covariance estimate 106 uses the pseudorange covariance 102, satellite positions 101, and a user position 103 to form an approximation to the covariance of the estimates produced by point estimate 104.

If not provided by GPS sensor 12, the required pseudorange covariance 102 may be generated in any of the usual ways. For instance, it may be estimated based on the data by smoothing the outer product of the pseudorange prediction errors. It could also be estimated from environmental and operational conditions: a diagonal covariance could be assumed, with the diagonal entries being determined by the approximate satellite elevations, the presence of selective availability, etc. Note that for purposes of forming point estimate 104, knowledge of pseudorange covariance 102 is required only to within a scale factor, and, in many cases, using the identity matrix will not degrade the performance of point estimate 104.

It should be noted that the covariance estimate 106 is not very sensitive to user position 103, and any recent point estimate or smoothed position should be adequate.

To reduce computational cost and to avoid convergence and initialization problems associated with iterative methods, it is preferable to implement point estimate 104 via some direct or closed-form (i.e., noniterative) method.

From a statistical viewpoint, what is desired is to embody in the sequence of position-bias estimates all position information contained in the input sequence of pseudoranges. In this way, for any processing of the input pseudoranges, there is a processing of the point estimate sequence which will be at least as accurate in a statistical sense. Put differently, what is desired is a sufficient statistic (one which contains as much information as the original data). (Refer again to "The GPS filtering problem," in Proc. IEEE PLANS 92, Monterey, Calif., March 1992 and "Sufficiency, data reduction, and sensor fusion for GPS," in Proc. Inst. Nav. Nat'l Tech. Meeting, San Diego, Calif., January 1992.)

Since sufficient statistics seldom exist, in practice statistics which are nearly sufficient are used. The maximum likelihood estimate is known, under certain conditions, to approach sufficiency, as is the nonlinear least squares estimate. In a preferred embodiment, a closed-form approximation to the maximum likelihood estimate or the nonlinear least squares estimate is used to implement point estimate 104. One such estimator is Bancroft's method, described in Bancroft, "An algebraic solution to the GPS equations," IEEE Trans. Aerosp. Elect. Sys. Vol. AES-21, No. 7, January 1985, which is incorporated herein by reference. However, in certain situations, Bancroft's method is known to suffer from numerical instability and inaccuracy. The methods described below in the Appendix are noniterative and provide approximations to the maximum likelihood estimate. (Under the Gaussian measurement error assumption, the maximum likelihood estimate and the nonlinear least squares estimate are identical.) They have certain advantages over Bancroft's method, including improved accuracy and numerical properties.

The Appendix also describes methods for computing point estimate covariance 107 when one of the methods described therein is employed to produce point estimate 105. Note that for any embodiment using an approximation to the maximum likelihood estimate, the well known GDOP may be used for covariance 107.

Smoothing Filter

Figure 1:
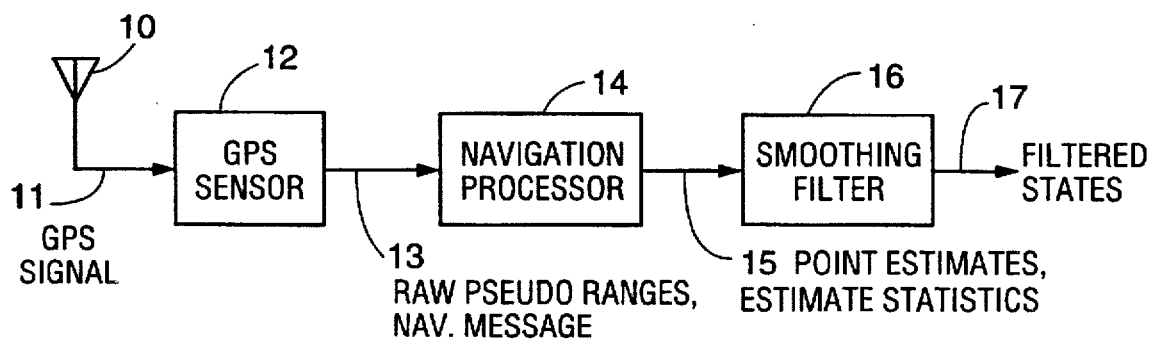
FIG. 1 is a block diagram of a preferred embodiment of the inventive apparatus.

Referring to FIG. 1, smoothing filter 16 processes the stream of point estimates 15 so as to reduce noise. This noise reduction is accomplished by using knowledge of the dynamics of the device or vehicle being tracked. As a result, smoothing filter 16 will take on a form which is dependent on the application. It should be noted that in some applications, smoothing may not be needed, and one embodiment of the invention may be to simply output the sequence of point estimates 15, without smoothing.

Figure 5:
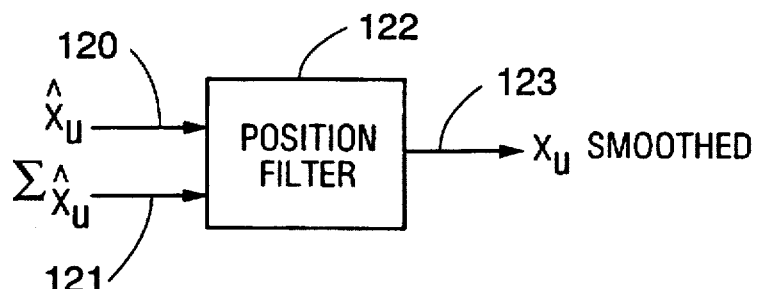
FIG. 5 is a block diagram of a smoothing filter which can be employed in the inventive apparatus.

FIG. 5 shows an embodiment of the smoothing filter. Point estimates of position 120 are processed along with their corresponding covariance estimates 121 in position filter 122. The output is a series of smoothed positions (and possibly velocities, accelerations, covariances, etc.) 123.

Position filter 122 may be implemented using the well known Kalman filter algorithm. Such Kalman filter algorithm may have the ususal time varying gain, or in the interest of minimizing computation, a constant gain may be set. It may also be implemented as a weighted average of past point position estimates 120. Filter 122 may be initialized (in a well known manner) using the first point estimate and covariance received. The filter process noise should be chosen in a way which fits the scenario. For instance, a relatively large process noise would be appropriate for a maneuvering aircraft, and a relative small one for a boat. As is commonly done in practice, the process noise may be adaptively adjusted to account for changes in dynamics. The gain in the constant gain filter may be similarly adjusted. The measurement noise is, of course, point estimate covariance 107; it also may be set to a reasonable constant, as is sometimes done in practice.

If computational resources permit its implementation, filter 122 is preferably a linear Kalman filter with a time-varying gain, since it is expected to have the best performance in most applications. The constant-gain filter and the weighted average offer computational simplicity at the expense of accuracy—a worthwhile trade-off in some scenarios.

Figure 6:
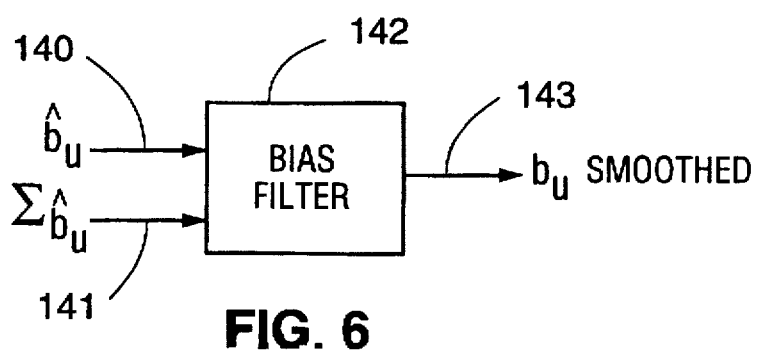
FIG. 6 is a block diagram of a smoothing filter which can be employed in the inventive apparatus.

Similar filters are easily developed for smoothing clock bias. Referring to FIG. 6, a stream of point estimates of user clock bias 140 and estimate covariance 141 are input to bias filter 142, where they are processed to yield a smoothed user clock bias (and possibly other state variables such as user clock drift) 143. The filters described above as being suitable for implementing filter 122 are directly applicable to bias filter 142, with the process noise figures and weighting matrices being determined by, among other things, the GPS sensor clock characteristics, rather than vehicle dynamics.

Figure 7:
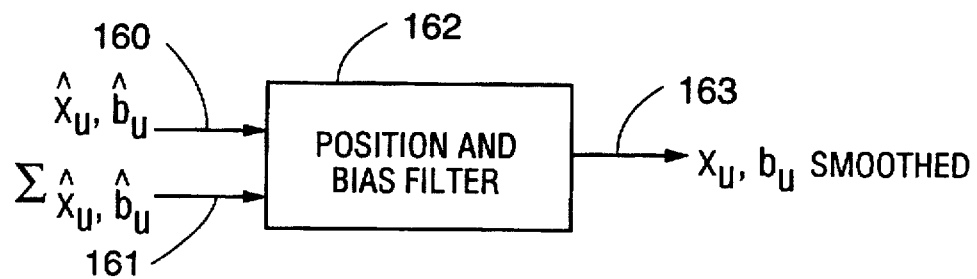
FIG. 7 is a block diagram of a smoothing filter which can be employed in the inventive apparatus.

Note that point estimates of user position and user clock bias 15 have correlated errors. Since, in certain cases, user clock bias follows known dynamics, clock bias errors may be revealed and used to reduce position estimate errors along the direction of correlation. One means for accomplishing this is shown in FIG. 7. In this preferred embodiment of smoothing filter 16, point estimates of position and bias 160 are filtered in parallel in position and bias filter 162 using the full covariance 161. The output is a sequence of smoothed position-bias pairs (and optionally other states and covariances) 163. The nature of filter 162 is to recognize and take advantage of any known correlation existing among errors in the components of the measurements. Accordingly, filter 162 can take on the form of any of the filters above, making the appropriate variable substitutions, that is, position for position and bias, etc.

Incorporating Outside Information

In many cases additional measurements or information is available which may be used to improve navigation processor 14 or smoothing filter 16.

Incorporating Clock Bias

Figure 8:
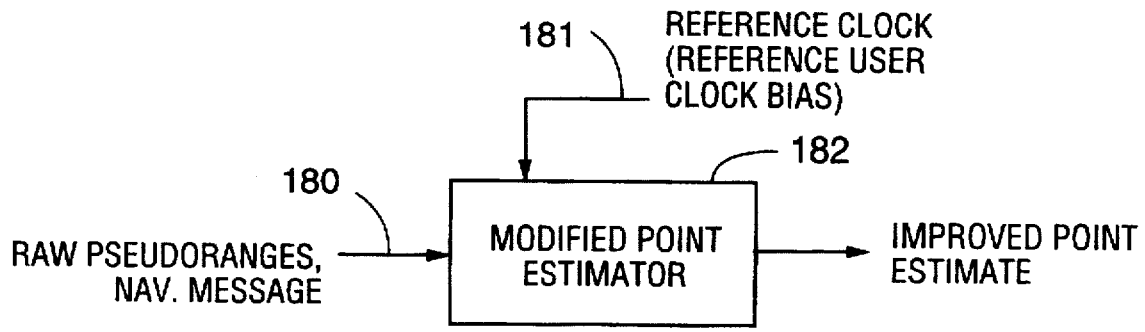
FIG. 8 is a block diagram of a navigation processor which can be employed in the inventive apparatus.

If there exists an external time reference or other information source from which an independent measurement of user clock bias may be somehow derived, navigation processor 14 may be improved by replacing point estimate 104 with the apparatus of FIG. 8, in which an independent clock bias measurement (and an estimate of its variance) 181 is input to modified point estimator 182 along with raw pseudoranges 180 to yield an improved point estimate 183.

Two preferred embodiments of modified point estimator 182 are described below in the Appendix.

The additional information provided by the independent clock bias measurement will improve the user clock bias estimate and the position estimate accuracy as described in "The Geometry of GPS solutions," in Proc. Inst. Nav. Nat'l Tech. Meeting, San Diego, Calif., January 1992. Covariance estimate 106 should be modified accordingly.

Figure 3:
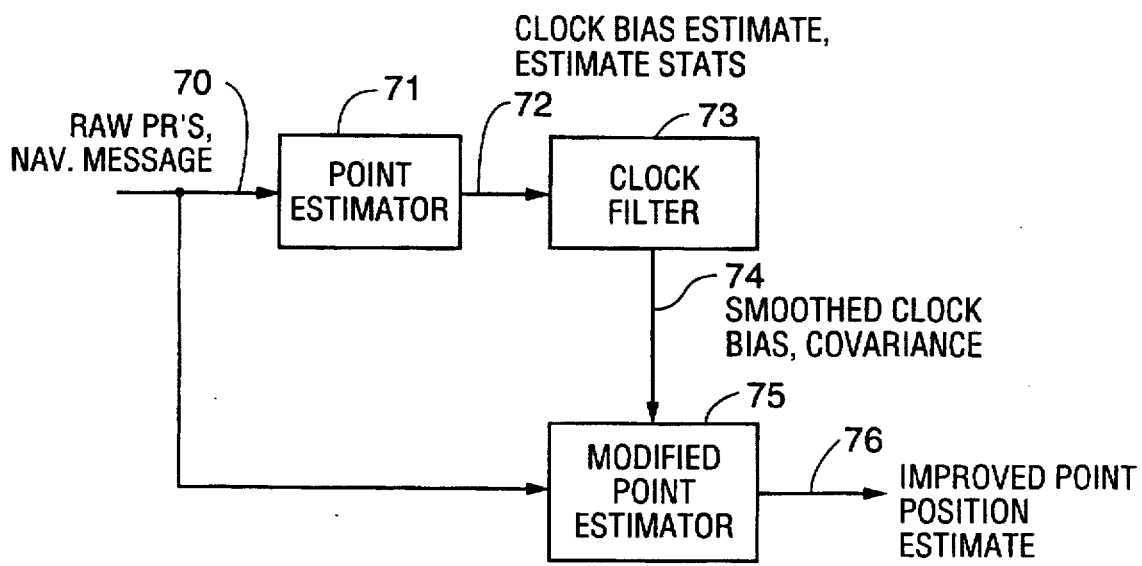
FIG. 3 is a block diagram of a portion of a third preferred embodiment of the inventive apparatus.

It turns out that such an independent clock bias measurement may be derived from past estimates of the user clock bias, using knowledge of characteristics of the receiver clock. The apparatus of FIG. 3 shows raw pseudoranges 70 applied to the input of a modified point estimator 75 as well as the input of a point estimator 71 and clock filter 73. Point estimator 71 and clock filter 73 produce a smoothed clock bias estimate and covariance 74 which is used in modified point estimator 75 to yield an improved point estimate 76. (Note that it is preferable to minimize the filter lag in the smoothed clock bias etimate.) When such an apparatus is used in navigation processor 14, smoothing filter 16 should be implemented as position filter 122.

Independent Position Constraint

In many scenarios an independent estimate of altitude is available. For instance, a marine user is likely to be at sea level. In such cases, the altitude information may be used in navigation processor 14 to improve point estimate accuracy, or it may be put into smoothing filter 16 as an independent measurement.

Incorporation into smoothing filter 16 is straightforward as both altitude and the point estimates are position coordinates. All that is needed is some idea of the accuracy of the altitude information so that the altitude may be properly weighted relative to the sequence of position estimates. (Note that there may be one altitude measurement for all time—the case of an ocean-going user, or there may be a sequence of altitude measurements—say the case of a land-based user estimating altitude from topological knowledge and a rough idea of his location.)

An independent measurement of altitude may be incorporated into navigation processor 14, for example, using the methods described below in Section A.5 of the Appendix (or methods similar thereto) for incorporating a bias measurement.

There are some scenarios in which the user is known to lie somewhere along a one-dimensional curve, say a train track or highway. As above, the additional information could be incorporated into smoothing filter 16 in the form of a constraint or a measurement, or into navigation processor 14, either as a constraint or measurement, or as a prior probability density in a Bayesian estimation scheme.

Note that if the additional spatial information (altitude, etc.) is incorporated as a constraint in navigation processor 14, fewer than four satellites are then required for a fix. If the additional information is incorporated via changes to smoothing filter 16, then linearization methods may be needed when there are fewer than four pseudoranges available.

Range Rates

Most commonly, the carrier is used to aid the code. In some cases, information not contained in the pseudoranges, i.e. range rate information, may be derived from the carrier. In such cases, the range rate information may be used to improve the navigation filter by estimating position and velocity (and user clock bias and drift) in navigation processor 14 and smoothing such position and velocity estimates in smoothing filter 16.

Since there is very little position information contained in the range rate (compared to that contained in the pseudoranges), it is sufficient to estimate velocity and clock drift based on position and bias estimates derived from measured pseudoranges. Note that given position and bias, the range rate measurements are linear in velocity and drift. The least-squares velocity and drift estimate is then trivially computed in closed-form using well known methods.

If, for some reason, the range rate measurements are extremely accurate, and there are more than four satellites, some position information may be contained therein. An improved position may be computed via linearization or some other scheme to find the position and velocity which minimize some norm of the error between the measured pseudoranges and range rates and those predicted by hypothesized positions and velocities.

Differential GPS

The apparatus of FIG. 1 has application to differential GPS. Though the basic concept of differential GPS (that of passing on corrections from a reference station to nearby users) is simple, providing and using differential corrections in practice can be much more complex. Recent results have indicated variety in the corrections provided by different receivers using the sample input data. Furthermore, the effect of these different corrections on different user equipment is also variable.

The problem for a differential reference receiver is to provide pseudorange corrections which account for errors common to both reference and user receivers, without passing on errors specific to the reference receiver itself. In particular, the effects of reference receiver multipath and the reference receiver clock are to be removed while errors due to the troposphere, ionosphere, and selective availability are to remain in the corrections. It turns out that removing the receiver clock is particularly difficult since short term clock fluctuations are impossible to predict. If the differential user filters the corrected pseudoranges in the usual manner, the effect of reference receiver errors on his solution will depend on his filter tuning.

Note that the position component of a point estimate of position and bias is independent of the bias errors in the corrected pseudoranges. Accordingly, the navigation filter of FIG. 1 used with the position smoothing filter of FIG. 5 will be immune to clock bias errors in the corrected pseudoranges.

GPS Integration

By splitting the GPS navigation filter into a two-stage process in the manner shown in FIG. 1, particularly simple sensor integration results. Current linearization techniques perform poorly in certain scenarios, and cannot easily handle a changing sensor configuration.

Figure 2:
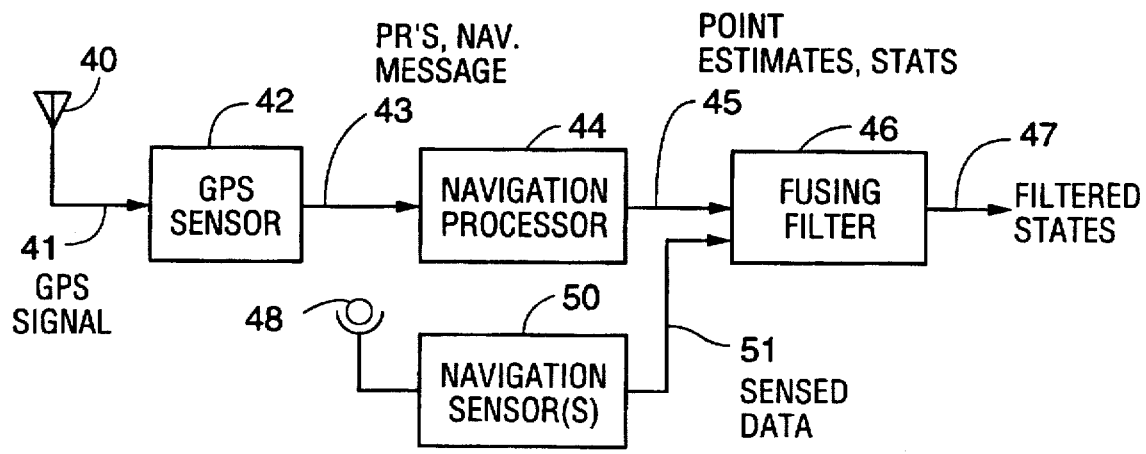
FIG. 2 is a block diagram of another preferred embodiment of the inventive apparatus.

As shown in FIG. 2, by converting the sequence of GPS measurements into a sequence of point position estimates, a simple fusing filter, linear relative to the navigation states, may be used to integrate navigation information from other sensors. Note that the sequence of point position estimates 45, if properly computed, will contain as much position information as contained in the original pseudoranges. Additionally, this sequence will be uncorrelated from one time to the next (to the extent that the raw pseudoranges are such). Accordingly, the need for linearizing pseudoranges is obviated, and, if the other navigation sensors output information in position coordinates, it is trivial to handle a changing sensor configuration.

If one were integrating GPS with an inertial navigation sensor (INS), sensed data 51 would consist of user accelerations, etc., and could, for instance, be applied to fusing filter 46 as a forcing function, in effect, transforming fusing filter 46 into a navigation processor for the INS, taking corrections from GPS. This method could also be used with a full inertial navigation unit which provides integrated velocity or position and attitude as inputs to filter 46. Similarly, speed and heading measurements from a dead reckoning system could be converted into velocity estimates and applied to fusing filter 46. If, say, altimeter measurements are available, altitudes and estimates of altitude measurement accuracy would be put into fusing filter 46 along with GPS point estimates 45. LORAN and other positioning systems may be integrated with GPS by converting all measurements into point position estimates (and estimate covariances) using processors similar to navigation processor 44, and integrating them using a simple linear fusing filter, such as a Kalman filter.

Alternate Sensors

By making changes to navigation processor 14 (or 44) to accommodate the different input data in a manner that will be apparent to those of ordinary skill in the art, other navigation sensors may be used in place of the GPS sensor 12 (or 42). It is necessary that the sensed data be such that it is possible to compute a sequence of reasonably independent point position estimates, which would then be smoothed using smoothing filter 16 (or fusing filter 46).

In case of ranges measured from a set of ranging transponders, navigation processor 14 may be implemented in accordance with the teaching of the Appendix in a manner similar to that described in Section A.5.

Various modifications and alterations in the described method and apparatus of the invention will be apparent to those skilled in the art without departing from the scope and spirit of this invention. Although the invention has been described in connection with specific preferred embodiments, it should be understood that the invention as claimed should not be unduly limited to such specific embodiments.

APPENDIX

A Direct Point Estimators

In this appendix methods for estimating position and bias in closed form based on pseudorange measurements and satellite positions are described. The methods are approximations to the maximum likelihood estimate, and are nearly sufficient, as they are approximately unbiased with variance approaching the Cramer-Rao lower bound.

To summarize, the maximum likelihood estimate is seen to be the minizer (over position and bias) of a nonquadratic cost function $J_{PR}$. The cost function is dificult to minimze directly, and the complexity is reduced somewhat by separating the cost into two components $J_{RD}$ and $K_{PR}$ which may be minimized seperately, one over position $J_{RD}$ and the other over bias $K_{PR}$. The cost function component $K_{PR}$ is minimized over bias using standard techniques. The cost function $J_{RD}$ is not so easily minimized.

Two equally viable methods are described for minimizing $J_{RD}$ over position. In the first method, described in A.2, an approximation to $J_{RD}$ is formulated and minimized using a constrained optimization process. In the another approach, detailed in A.3, the cost function component is broken up further into units which are easily minimized. The minimizers are combined in a manner which gives an approximation to the minimizer of the entire cost function.

Section A.4 methods for comupting estimate covariance and the remaining sections decsribe methods for incorporating additional measurements—altitude, bias and the like— into the position and bias estimators.

A.1 The Maximum Likelihood Estimate

Some notation is needed. There are $n$ satellites located in $p$-space at positions $x_i, i = 1, ..., n$, and a user at $x_u$. The coordinate origin coincides with the first satellite, $x_1 = 0$. The user is a distance $r_u = \|x_u\|$ from the origin and the $i$th satellite is a distance $r_i = \|x_i\|$ from the origin. The distance from the $i$th satellite to the user is denoted $D_i$, $$D_i = \|x_i - x_u\|. \tag{1}$$

The column matrix of user-satellite distances is denoted $D$.

There are $n$ pseudoranges, the $i$th pseudorange $\rho_i$ given as the sum of the $i$th user-satellite distance $D_i$ and an unknown user clock bias $b_u$, $$\rho_i = D_i + b_u. \tag{2}$$

The column of $n$ pseudoranges $\rho$ is then $$\rho = D + 1 b_u, \tag{3}$$

1 being a column of ones.

Denoting by $\tilde{\rho}$ the column of measured pseudoranges, and assuming Gaussian measurement errors with covariance $\Sigma_\rho$, the maximum likelihood estimator of receiver position $x_u$ and clock bias $b_u$ is given as the minimizer of the cost $J_{PR}$:

$$\begin{bmatrix} \hat{x}_{ML} \\ \hat{b}_{ML} \end{bmatrix} = \text{Arg} \min_{x_u, b_u} \{J_{PR}(x_u, b_u)\}, \tag{4}$$

$$J_{PR}(x_u, b_u) = \epsilon_{PR}^T \Sigma_\rho^{-1} \epsilon_{PR}, \tag{5}$$

$$\epsilon_{PR}(x_u, b_u) = \tilde{\rho} - D(x_u) - 1 b_u, \tag{6}$$

the quantity $\epsilon_{PR}$ being referred to as the *pseudorange prediction error*. Note that the maximum likelihood estimate is, in this case, the nonlinear least squares estimate.

Due to the nonlinear relationship between the pseudoranges and receiver position and clock bias, it is difficult to minimize $J_{PR}$ directly. We have discovered that the complexity of the problem can be reduced somewhat by separately estimating user position $x_u$ and clock bias $b_u$ in the following manner. Consider the $n \times n$ matrix $Q$ defined by $$Q \stackrel{\text{def}}{=} \begin{bmatrix} Z \\ 1^T \Sigma_\rho^{-1} \end{bmatrix}, \tag{7}$$

where $Z$ is an $(n-1) \times n$ differencing matrix $$Z \stackrel{\text{def}}{=} [-1 \ \ I] \tag{8}$$

with the property that $Z1 = 0$. Note that $Q$ is full rank except under certain degenerate pseudorange covariances. Accordingly, the covariance inverse $\Sigma_\rho^{-1}$ may be written as $$\Sigma_\rho^{-1} = Q^T (Q \Sigma_\rho Q^T)^{-1} Q = Q^T \begin{bmatrix} Z \Sigma_\rho Z^T & 0 \\ 0 & 1^T \Sigma_\rho^{-1} 1 \end{bmatrix}^{-1} Q. \tag{9}$$

Substituting into $J_{PR}$—recall $Z1 = 0$—we have $$J_{PR}(x_u, b_u) = J_{RD}(x_u) + K_{PR}(x_u, b_u), \tag{10}$$

where, $$J_{RD}(x_u) = [\tilde{\rho} - D(x_u)]^T Z^T (Z \Sigma_\rho Z^T)^{-1} Z [\tilde{\rho} - D(x_u)] \tag{11}$$

$$K_{PR}(x_u, b_u) = \left\{ 1^T \Sigma_\rho^{-1} [\tilde{\rho} - D(x_u)] - \left(1^T \Sigma_\rho^{-1} 1\right) b_u \right\}^2 \bigg/ 1^T \Sigma_\rho^{-1} 1. \tag{12}$$

Note that both $J_{RD}$ and $K_{PR}$ are nonnegative scalar functions. The quantity $J_{RD}$ depends soley on user position $x_u$, not on user clock bias $b_u$. The quantity $K_{PR}$ depends on both position and bias; however, by proper choice of bias $b_u$ it can be made to take on any nonnegative value, including zero (assuming $\Sigma_\rho$ nonsingular, of course). Therefore, to minimize $J_{\text{PR}} = J_{\text{RD}} + K_{\text{PR}}$ over position and bias one can simply minimize $J_{\text{RD}}$ over position, and, based on that position, choose the bias which makes the nonnegative $K_{\text{PR}}$ zero.

Denote by $d$ the set of *pseudorange differences* (RDs), formed by subtracting the first pseudorange from each of the others, $$d = Z\rho = ZD, \tag{13}$$

and by $\tilde{d}$ the set of measured RDs formed using measured pseudoranges. The cost $J_{\text{RD}}$ may be written in terms of pseudorange differences, $$J_{\text{RD}}(x_u) = \epsilon_{\text{RD}}^T \Sigma_d^{-1} \epsilon_{\text{RD}}, \tag{14}$$

$$\epsilon_{\text{RD}}(x_u) = \tilde{d} - d(x_u), \tag{15}$$

the quantity $\epsilon_{\text{RD}}$ being the column of *pseudorange difference prediction errors*, and the matrix $\Sigma_d = Z\Sigma_\rho Z^T$ being the pseudorange difference covariance matrix. The maximum likelihood estimate of position is then the position minimizing a weighted norm of the pseudorange difference prediction error, $$\hat{x}_{\text{ML}} = \text{Arg}\min_{x_u} \left\{ J_{\text{RD}}(x_u) = \epsilon_{\text{RD}}^T \Sigma_d^{-1} \epsilon_{\text{RD}} \right\}, \tag{16}$$

and the maximum likelihood estimate clock bias is $$\hat{b}_{\text{ML}} = \text{Arg}\min_{b_u} \left\{ K_{\text{PR}}(x_u = \hat{x}_{\text{ML}}, b_u) \right\}, \tag{17}$$

$$= \mathbf{1}^T \Sigma_\rho^{-1} [\tilde{\rho} - D(\hat{x}_{\text{ML}})] \Big/ \mathbf{1}^T \Sigma_\rho^{-1} \mathbf{1}. \tag{18}$$

The pseudorange difference prediction error $\epsilon_{\text{RD}}$ is nonlinear in position $x_u$, and, as was the case with $J_{\text{PR}}$, $J_{\text{RD}}$ is not easily minimized directly. However, two alternative approaches are described below. In the first approach, an approximation to $J_{\text{RD}}$ is developed via an *equation error*. This approximation differs form $J_{\text{RD}}$ in a known manner which can be accounted for; it has the appealing property of being more readily minimized than $J_{\text{RD}}$. The second approach is a *divide and conquer* method which builds up an estimate by combining position and bias estimates based on subsets of the measured pseudorange differences.

A.2 Equation Error Methods

The equation error is derived by manipulating (15) and (1). Expanding (1) to obtain an expression for $D_i^2$ gives $$D_i^2 = r_u^2 + r_i^2 - 2x_i^T x_u. \tag{19}$$

20

Recall that the first satellite is at the coordinate origin, i.e. $D_1 = r_u$. Equation (15) gives $$\tilde{d}_i = D_i - r_u + \epsilon_{RDi}, \tag{20}$$

which yields another expression for $D_i^2$, $$D_i^2 = r_u^2 + \tilde{d}_i^2 + 2\tilde{d}_i r_u - (2D_i + \epsilon_{RDi})\epsilon_{RDi}. \tag{21}$$

Equating (19) and (21), $$(r_i^2 - \tilde{d}_i^2) - 2\tilde{d}_i r_u - 2x_i^T x_u = \epsilon_{EEi}, \tag{22}$$

where $\epsilon_{EEi}$ is the $i$th element of the equation error, $$\epsilon_{EEi} = (2D_i + \epsilon_{RDi})\epsilon_{RDi}. \tag{23}$$

Stacking the $(n-1)$ instances ofinstances of (22) gives $$\gamma - 2\tilde{d}r_u - 2Ax_u = \epsilon_{EE}, \tag{24}$$

where $$\gamma = \begin{bmatrix} r_2^2 - \tilde{d}_2^2 \\ \vdots \\ r_n^2 - \tilde{d}_n^2 \end{bmatrix}, \quad A = \begin{bmatrix} x_2^T \\ \vdots \\ x_n^T \end{bmatrix}, \quad \epsilon_{EE} = \begin{bmatrix} \epsilon_{EE2} \\ \vdots \\ \epsilon_{EEn} \end{bmatrix}. \tag{25}$$

The position estimate $\hat{x}_u$ is taken to be the minimizer of the weighted equation error norm, $$\hat{x}_u = \text{Arg}\min_{x_u}\{J_{EE}(x_u)\}, \tag{26}$$

$$J_{EE}(x_u) = \epsilon_{EE}^T W \epsilon_{EE}, \tag{27}$$

$W$ being a weighting matrix.

How does $J_{EE}$ compare to $J_{RD}$? Note that GPS positioning errors are many orders of magnitude smaller than satellite-user distances. Therefore, near the maximum likelihood estimate, $$\epsilon_{EEi} = (2D_i + \epsilon_{RDi})\epsilon_{RDi} \approx 2D_i\epsilon_{RDi}, \tag{28}$$

that is, $$\epsilon_{EE} \approx 2A_D \epsilon_{RD}, \quad A_D = \begin{bmatrix} D_2 & 0 & \cdots & 0 \\ 0 & \ddots & \ddots & \vdots \\ \vdots & \ddots & \ddots & 0 \\ 0 & \cdots & 0 & D_n \end{bmatrix}, \tag{29}$$

and the position minimizing $J_{EE}$ (27) is expected to coincide with the maximum likelihood estimate (cf. (16)) when the weighting matrix $W$ is given by $$W = (A_D \Sigma_d A_D)^{-1}. \tag{30}$$

Before continuing, note that the desired weighting matrix depends on knowledge of user position. Since position is unknown, it is suggested that $W$ be computed based on either a previous solution or the approximation that the satellites are roughly equidistant from any user near the earth, i.e. $W = \Sigma_d^{-1}$.

The problem of minimizing $J_{PR}$ over position and bias has been reduced to the problem of minimizing $J_{EE}$ over position. Minimizing $J_{EE}$ is not straightforward since $\epsilon_{EE}$ is nonlinear in position and bias. However, we have discovered that by treating user range to the origin $r_u$ as an independent variable with no relationship to user position $x_u$, it is possible to minimize $J_{EE}$ by judiciously constraining the problem. Several methods for minimizing $J_{EE}$ are described below. One method exactly minimizes $J_{EE}$, but is computationally more demanding and numerically more sensitive than the others. The other methods approximately minimize $J_{EE}$ and are therefore less accurate, but are also less computationally intensive and numerically more robust.

A.2.1 Constrained Minimization

Denote by $\theta$ the variables $$\theta = \begin{bmatrix} x_u \\ r_u \end{bmatrix}. \tag{31}$$

Defining $$\Gamma = 2[A \quad d], \tag{32}$$

the equation error $\epsilon_{EE}$ can be written as $$\gamma - \Gamma\theta = \epsilon_{EE}. \tag{33}$$

Note that the equation error is linear in the augmented variables $\theta$. The problem of minimizing $J_{EE}$ can now be cast in terms of an equality constrained quadratic program:

$$\hat{\theta} = \begin{bmatrix} \hat{x}_u \\ \hat{r}_u \end{bmatrix} = \operatorname*{Arg\,min}_{\theta} \left\{ \epsilon_{EE}^T W \epsilon_{EE} \right\}, \quad \text{s.t.} \quad \theta^T M \theta = 0, \quad M = \begin{bmatrix} I & 0 \\ 0 & -1 \end{bmatrix}. \tag{34}$$

A direct solution may be obtained by applying Lagrange multiplier methods to the constrained optimization problem above. The Kuhn-Tucker conditions require that the minimizing $\theta$ satisfy $$0 = -\Gamma W(\gamma - \Gamma\theta) + \lambda M\theta, \tag{35}$$

$$0 = \theta^T M \theta, \tag{36}$$

where $\lambda$, the so-called *shadow cost*, is an indicator of the cost associated with requiring the solution satisfy the constraint. Equation (35) may be solved for $\theta$ in terms of $\lambda$, $$\theta(\lambda) = (\Gamma^T W \Gamma + \lambda M)^{-1} \Gamma^T W \gamma. \tag{37}$$

The constraint (36) is now used to fix $\lambda$, thereby determining $\hat{\theta}$, $$0 = \theta^T M \theta = \gamma^T W \Gamma (\Gamma^T W \Gamma + \lambda M)^{-1} M (\Gamma^T W \Gamma + \lambda M)^{-1} \Gamma^T W \gamma. \tag{38}$$

Define the $(n-1) \times (n-1)$ matrix $N$ by $$N = \begin{bmatrix} I & 0 \\ 0 & \sqrt{-1} \end{bmatrix}, \tag{39}$$

and note that its inverse $N^{-1}$ is simply its complex conjugate. Substituting $M = N \cdot N$ above, $$\begin{aligned}
\theta^T M \theta &= \gamma^T W \Gamma N^{-1} N (\Gamma^T W \Gamma + \lambda NN)^{-1} NN (\Gamma^T W \Gamma + \lambda NN)^{-1} NN^{-1} \Gamma^T W \gamma, \\
&= \gamma^T W \Gamma N^{-1} (N^{-1} \Gamma^T W \Gamma N^{-1} + \lambda I)^{-2} N^{-1} \Gamma^T W \gamma. \\
&= \gamma^T W \Gamma N^{-1} Q (G + \lambda I)^{-2} Q^{-1} N^{-1} \Gamma^T W \gamma,
\end{aligned} \tag{40}$$

where the $(p+1) \times (p+1)$ matrix $N^{-1} \Gamma^T W \Gamma N^{-1}$ has been decomposed according to $$QGQ^{-1} = N^{-1} \Gamma^T W \Gamma N^{-1}, \tag{41}$$

$G$ being a diagonal matrix of eigenvalues $g_i$, and $Q$ containing the associated eigenvectors. Identifying $f_i$ and $h_i$ as the $i$th elements of $\gamma^T W \Gamma N^{-1} Q$ and $Q^{-1} N^{-1} \Gamma^T W \gamma$, respectively, $$\theta^T M \theta = \sum_{i=1}^{i=p+1} f_i \cdot h_i \cdot \frac{1}{(g_j + \lambda)^2}. \tag{42}$$

The desired $\lambda$ is then one of the roots of a 2p-order polynomial, $$0 = \sum_{i=1}^{p+1} f_i \cdot h_i \cdot \left[ \prod_{j \neq i} (g_j + \lambda)^2 \right]. \tag{43}$$

Each real $\lambda$ solving (43) is substituted into (37), giving a potential solution $\hat{x}_u(\lambda)$. The one with minimum cost $J_{EE}$ is $\hat{x}_u$, the weighted equation error norm minimizer.

It should be pointed out that a slightly different formulation leads to a solution which, in some circumstances, is more stable numerically than the one presented above. Form the following modified equation error by dividing (44) by $-2r_u$, $$\epsilon'_{EE} \stackrel{\text{def}}{=} -\epsilon_{EE}/(2r_u) = d - \frac{1}{2}\gamma \alpha_u + A l_u. \tag{44}$$

23

$l_u = x_u/r_u$ being the user line-of-sight to the first satellite, and $\alpha_u = 1/r_u$ being the inverse of the user range to the origin. As above, the minimizer of the modified equation error norm $\epsilon'_{EE}{}^T W \epsilon'_{EE}$ over $x_u$ can be written in terms of a constrained optimization, this time over the variables $\alpha_u$ and $l_u$.

$$\hat{x}_u = \hat{l}_u/\hat{\alpha}_u, \qquad \begin{bmatrix} \hat{\alpha}_u \\ \hat{l}_u \end{bmatrix} = \text{Arg} \min_{(\alpha_u, l_u)} \left\{ \epsilon'_{EE}{}^T W \epsilon'_{EE} \right\}, \quad \text{s.t. } l_u^T l_u = 1. \tag{45}$$

In this case the constraint reflects the fact that the line-of-signt vector $l_u$ has unit length.

Defining the Lagrangian by $$\mathcal{L}(l_u, \alpha_u, \lambda) = \epsilon'_{EE}{}^T W \epsilon'_{EE} + \lambda(l_u^T l_u - 1), \tag{46}$$

the Kuhn-Tucker conditions require that $(l_u, \alpha_u, \lambda)$ satisfy the following.

$$0 = \gamma^T W \gamma \alpha_u - \gamma^T W (\tilde{d} + A l_u), \tag{47}$$

$$0 = 2(A^T W A + \lambda I) l_u + (2 A^T W \tilde{d} - A^T W \alpha_u), \tag{48}$$

$$0 = l_u^T l_u - 1. \tag{49}$$

Equation (47) gives $$\alpha_u = \left( \gamma^T W \tilde{d} + \gamma^T W A l_u \right) \Big/ \gamma^T W \gamma. \tag{50}$$

Substisuting into (48) and solving for $l_u$, $$l_u = - \left( A^T V A + 2\lambda I \right)^{-1} A^T V \tilde{d}, \tag{51}$$

where $V$ is given by $$V = 2W - W \gamma \gamma^T W / \left( \gamma^T W \gamma \right). \tag{52}$$

Using (51) in the constraint (49) yields $$1 = \tilde{d}^T V A \left( A^T V A + 2\lambda I \right)^{-2} A^T V \tilde{d}. \tag{53}$$

$$= \tilde{d}^T V A Q (G + 2\lambda I)^{-2} Q^{-1} A^T V \tilde{d}. \tag{54}$$

$$\tag{55}$$

where $A^T V A$ has been decomposed via $$Q G Q^{-1} = A^T V A, \tag{56}$$

$G$ a diagonal matrix with $i$th diagonal element $g_i$. Defining $f_i$ and $h_i$ as the $i$th elements of $\tilde{d}^\top VAQ$ and $A^{-1}A^\top V\tilde{d}$ respectivey, the constraint (51) gives a polynomial expression for $\lambda$:

$$0 = 1 - \sum_{i=1}^{p} f_i \cdot h_i \cdot \frac{1}{(g_i + 2\lambda)^2}, \tag{57}$$

$$= \prod_{i=1}^{p}(g_i + 2\lambda)^2 - \sum_{i=1}^{p} f_i \cdot h_i \cdot \prod_{j \neq i}(g_j + 2\lambda)^2 \tag{58}$$

As above, all real $\lambda^*$ solving the $2p$-order polynomial (58) are used in (50) and (51) to give candidate estimates $x_u(\lambda^*)$. The $x_u(\lambda^*)$ having the smallest modified equation error norm will be the modified equation error norm minimizer over all $x_u$, and, with proper weighting $W$, will approximate the maximum likelihood estimate.

Due to the nature of the constraint, however, not all $\lambda$ satisfying (58) need be computed or checked. The shadow cost $\lambda$ is known to be the sensitivity of the minimum cost function value to changes in the constraint value. Since the constraint is a shpere, the shadow cost is proportional to the gradient of the cost $\epsilon_{EE}'^\top W \epsilon_{EE}'$ at $x_u(\lambda)$. Now, since the cost monotonically increases with its gradient, the real $\lambda^*$ solving (58) with the smallest absolute value is the desired one, producing the minimum cost.

A.2.2 Projected Equation Error

The second solution is a computationally inexpensive alternative. Generally it is a bit less accurate than the solutions above, and requires at least $p+1$ pseudorange differences.

Consider the equation error as written in (44), $$\gamma - 2\tilde{d}r_u - 2Ax_u = \epsilon_{EE}.$$

Note that if the term $2\tilde{d}r_u$ were eliminated, the equation error would be proportional to user position, and its norm could be minimized using standard linear methods. This can be accomplished by projecting $\epsilon_{EE}$ onto a space orthogonal to $\tilde{d}$. Define the idempotent projection matrix $P_{\tilde{d}}^\perp$ as follows, $$P_{\tilde{d}}^\perp = I - P_{\tilde{d}}, \qquad P_{\tilde{d}} = \tilde{d}(\tilde{d}^\top \tilde{d})^{-1}\tilde{d}^\top. \tag{59}$$

Note that $P_{\tilde{d}}^\perp \tilde{d} = 0$. Premultiplying (44) by $P_{\tilde{d}}^\perp$, $$P_{\tilde{d}}^\perp \gamma - 2P_{\tilde{d}}^\perp A x_u = P_{\tilde{d}}^\perp \epsilon_{EE}. \tag{60}$$

The point position estimate $$\hat{x}_u = \frac{1}{2}(A^\mathsf{T} P_d^\perp V P_d^\perp A)^{-1} A^\mathsf{T} P_d^\perp V P_d^\perp \gamma \tag{61}$$

is easily seen to minimize $J_{EE}$ when $W = P_d^\perp V P_d^\perp$. Similar estimators may be derived by projecting $\epsilon_{EE}$ onto spaces orthogonal to the columns of $\gamma$ or $A$.

A.2.3 Force-Fit Methods

As in the constrained optimization method above, the third method treats user position $x_u$ and range $r_u$ as unrelated quantities. However, rather than minimize $J_{EE}$ over $x_u$ and $r_u$ while maintaining the relationship $r_u = \| x_u \|$, the method is simplified by first minimizing $J_{EE}$ over both position and range variables, and then reconciling any discrepencies in the relationship $r_u = \| x_u \|$.

Recall, $\theta$ contains the variables $$\theta = \begin{bmatrix} x_u \\ r_u \end{bmatrix},$$

and the equation error $\epsilon_{EE}$ can be written as $$\gamma - \Gamma \theta = \epsilon_{EE}, \qquad \Gamma = 2[A \quad d].$$

Consider first the case that $\Gamma$ has full column rank, e.g., $(n > p + 1)$ noncoplanar satellites available. In this case, the $\theta$ minimizing $J_{EE}$ is given by $$\theta^* = \begin{bmatrix} x_u^* \\ r_u^* \end{bmatrix} = (\Gamma^\mathsf{T} W \Gamma)^{-1} \Gamma W \gamma. \tag{62}$$

However, there is no guarantee that $\theta^*$ has consistent range and position components. To resolve any discrepencies between the position and range components of $\theta^*$, the position estimate $\hat{x}_u$ is taken to be the position component of the point $\theta$ closest to $\theta^*$ on the cone $r_u = \| x_u \|$. A little algebra gives the following.

$$\hat{x}_u = x_u^*/(1 + \lambda^\pm), \tag{63}$$

$$\lambda^\pm = \beta \pm \sqrt{\beta^2 - 1}, \qquad \beta = \frac{\theta^{*\mathsf{T}} \theta^*}{\theta^{*\mathsf{T}} M \theta^*}. \tag{64}$$

Between $\lambda^+$ and $\lambda^-$, the one with $r_u^*/(1 - \lambda^\pm)$ positive and purturbing $x_u^*$ the least should be taken. If $r_u^*/(1 - \lambda^\pm)$ are both negative, $\hat{x}_u$ is zero. If $x_u^* = 0$, then $\hat{r}_u = r_u^*/2$, and nothing more can be said about $\hat{x}_u$.

Now focus on the case that $\Gamma$ has rank $p$, as would generally occur in the presence of $p + 1$ satellites. Here, the equation error will achieve a minimum over $\theta$ not just at a single point, but along a line lying in the null space of $\Gamma$. The constraint that $\theta$ lie on the cone $r_u = \|x_u\|$, will typically produce a unique minimizer.

Decompose $\Gamma$ using a complete orthogonal factorization, $$\Gamma = UGV^\mathsf{T}, \tag{65}$$

where $U$ and $U$ are orthonormal, and $G$ is an $n \times p$ diagonal matrix. Since the rank of $\Gamma$ is $p$, $G$ will have $p$ nonzero diagonal entries and one zero column. The equation error is then minimized when $\theta$ satisfies $$\theta^*(\lambda) = \Gamma^+ \gamma + \lambda \theta^\perp, \tag{66}$$

where $\theta^\perp$ is the column of $V$ corresponding to the zero column of $G$—it lies in the null space of $\Gamma$, and where $\Gamma^+$ is the pseudo-inverse of $\Gamma$, which may be written as $$\Gamma^+ = VG^+ U^\mathsf{T}, \tag{67}$$

$G^+$ being $G$ with its nonzero entries inverted. The quantity $\lambda$ is found via application of the constraint $\theta^\mathsf{T} M \theta = 0$, that is, $r_u = \|x_u\|$. Using $\theta$ from (66) in $\theta^\mathsf{T} M \theta = 0$, and solving the resulting quadratic, $$\lambda^\pm = -\alpha \pm \sqrt{\alpha^2 - \beta}, \qquad \alpha = \frac{\gamma^\mathsf{T} \Gamma^{+\mathsf{T}} M \theta^\perp}{\theta^{\perp\mathsf{T}} M \theta^\perp}, \qquad \beta = \frac{\gamma^\mathsf{T} \Gamma^{+\mathsf{T}} M \Gamma^+ \gamma}{\theta^{\perp\mathsf{T}} M \theta^\perp}. \tag{68}$$

The position estimate is the first $p$ components of $\theta^*(\lambda^\pm)$, and the range estimate is the last component. Any (possibly both, as discussed in "Existence and uniqueness of GPS solutions," *IEEE Trans. Aerosp. Elect. Sys.*, Vol. 27, No. 6, November 1991, authored by the inventors, and incorporated here by reference.) of $\lambda^\pm$ which give a positive range component result in a valid positing estimate.

There is an alternative "force fit" solution which is valid when the satellites are non-coplanar, i.e. when $A$ has full column rank. It is described in "Existence and uniqueness of GPS solutions," *IEEE Trans. Aerosp. Elect. Sys.*, Vol. 27, No. 6, November 1991, and repeated here for completeness. The approach is to minimize the equation error over position $x_u$ in terms of range $r_u$, and then use the solution in $r_u^2 = x_u^\mathsf{T} x_u$ to find the unknown range:

$$x_u^*(r_u) = (A^\mathsf{T} W A)^{-1} A^\mathsf{T} W (\gamma/2 - \tilde{d} r_u) \tag{69}$$

mininizes $\epsilon_{EE}^\mathsf{T} W \epsilon_{EE}$ for a fixed $r_u$ unrelated to $x_u$. Forcing the constraint $r_u^2 = x_u^\mathsf{T} x_u$, $$r_u^\pm = -\alpha \pm \sqrt{\alpha^2 + \beta/2}, \tag{70}$$

$$\alpha = \frac{\tilde{d}^\mathsf{T} W A (A^\mathsf{T} W A)^{-2} A^\mathsf{T} W \gamma}{2\left[1 - \tilde{d}^\mathsf{T} W A (A^\mathsf{T} W A)^{-2} A^\mathsf{T} W \tilde{d}\right]} \tag{71}$$

$$\beta = \frac{\gamma^T W A (A^T W A)^{-2} A^T W \gamma}{2 \left[ 1 - \bar{d}^T W A (A^T W A)^{-2} A^T W \bar{d} \right]}. \tag{72}$$

Any $x_u^*(r_u^\pm)$ with $r_u^\pm \geq 0$ is a valid estimate. Note that in the case of $p+1$ satellites, the solution simplifies as the quantity $(A^T W A)^{-1} A^T W$ may be replaced with $A^{-1}$.

A.2.4 Pseudoranges

While the complexity of the problem is reduced somewhat by converting the problem to one of minimizing range difference prediction errors over position, there is no fundamental barrier to applying all of the techniques above to minimizing the weighted norm of an equation error written in terms of the pseudoranges directly.

The analogus equation error is derived by squaring up the expression for the pseudorange measurement, $$\tilde{\rho}_i = D_i + b_u + \epsilon_{PRi}. \tag{73}$$

After squaring and gathering terms, $$(\tilde{\rho}_i^2 - r_i^2) - [-2x_i^T \quad 2\tilde{\rho}_i \quad 1] \begin{bmatrix} x_u \\ b_u \\ b_u^2 - r_u^2 \end{bmatrix} = (2D_i + \epsilon_{PRi})\epsilon_{PRi} = \epsilon_{EEi}. \tag{74}$$

Stacking the $n$ instances of the above expression, we have $$\gamma - \Gamma \theta = \epsilon_{EE}, \qquad \Gamma = [-2A \quad 2\tilde{\rho} \quad 1], \quad \gamma = \begin{bmatrix} \tilde{\rho}_1^2 - r_1^2 \\ \vdots \\ \tilde{\rho}_n^2 - r_n^2 \end{bmatrix}, \quad \theta = \begin{bmatrix} x_u \\ b_u \\ b_u^2 - r_u^2 \end{bmatrix}. \tag{75}$$

Note that the weighted pseudorange equation error norm approximates the cost $J_{PR}$ for position-bias pairs near the maximum likelihood estimate when the weighting is given by $$W = (A_D \Sigma_\rho A_D)^{-1}. \tag{76}$$

Here $A_D$ is an $n \times n$ diagonal matrix with $i$th diagonal entry $D_i$.

With the exception of a slightly different constraint equation—it's still a quadratic constraint—the equation error takes on the same form (from a minimization viewpoint) as in the pseudorange difference case. The same minimization methods described above can be used to minimize the weighted pseudorange equation error norm with obvoius minor changes. However, there is a relative increase in numerical complexity associated with minimizing $J_{PR}$ directly, rather than minimizing $J_{RD}$ first: There are four variables over which to minimize rather than three, and the solution vector and measurement set will have relatively unpredictable magnitudes due to the clock bias.

A.3 Divide and Conquer

An alternate method for approximating the maximum likelihood estimate is the *divide and conquer method*, described in "A divide and conquer approach to least-squares estimation," *IEEE Trans. Aerosp. Elect. Sys.*, Vol. 26, No. 2, March 1990, authored by one of the inventors (Abel), and included here by reference. The basic idea is to divide the input data set into manageable segments, make point estimates based on each of the data segments, and combine the point estimates to form a unified estimate.

For the case at hand, one of two approaches is preferred. In the first approach, pseudorange differences are formed. The pseudorange difference vector is divided into segments by taking the first $p$ (recall, in three dimensions $p = 3$) pseudorange differences to form the first segment, the next three pseudorange differences to form the next segment, and so on, until there are three or less pseudorange differences remaining. The final segment is formed using the last three pseudorange differences. Note that the last segment might share one or two range differences with the next-to-last segment. Using one of the methods described above, estimate position for each $p$-long pseudorange difference segment. Then combine the position estimates using the weighting specified in "A divide and conquer approach to least-squares estimation," *IEEE Trans. Aerosp. Elect. Sys.*, Vol. 26, No. 2, March 1990. If any data segment produces two valid position estimates, then use the estimate which is closest to the other estimates obtained. Of course, once position is estimated, user clock bias may be found using (18).

In the second approach, the raw pseudoranges are used, and position-bias pairs are estimated and combined. This method will require more computation, and may be more sensitive numerically.

A.4 Estimate Accuracy

When pseudorange errors are small compared with intersatellite distances, and when there are sufficiently many nondegerately placed satellites, the maximum likelihood estimate will (to a good approximation) be unbiased and will have covariance given by the inverse of the Fisher information matrix, $$\text{Var}\left\{\begin{bmatrix}\hat{x}_{\text{ML}}\\ \hat{b}_{\text{ML}}\end{bmatrix}\right\} \approx J^{-1}_{x_u, b_u} = \begin{bmatrix} B^T \Sigma_p^{-1} B & B^T \Sigma_p^{-1} 1 \\ 1^T \Sigma_p^{-1} B & 1^T \Sigma_p^{-1} 1 \end{bmatrix}^{-1} , \qquad (77)$$

$B$ being the matrix whose rows are the unit-length user-satellite line-of-sight vectors. The variance of the position and bias components may be written as $$\text{Var}\{\hat{x}_{\text{ML}}\} = \left\{ B^T \left[ \Sigma_d^{-1} - \frac{\Sigma_p^{-1} 1 1^T \Sigma_p^{-1}}{1^T \Sigma_p^{-1} 1} \right] B \right\}^{-1} , \qquad (78)$$

$$\text{Var}\{\hat{b}_{\text{ML}}\} = \left\{1^\top \Sigma_\rho^{-1} 1 - 1^\top \Sigma_\rho^{-1} B (B^\top \Sigma_\rho^{-1} B)^{-1} B^\top \Sigma_\rho^{-1} 1\right\}^{-1}. \qquad (79)$$

If one of the equation error methods is employed to estimate position, and bias is estimated via (18), the estimate covariance may be approximated by expanding the equation error in a Taylor series about the true position. Some algebra reveals the following:

$$\text{Var}\left\{\begin{bmatrix}\hat{x}_u \\ \hat{b}_u\end{bmatrix}\right\} \approx \begin{bmatrix} C_{x_u,x_u} & C_{x_u,b_u} \\ C_{x_u,b_u}^\top & C_{b_u,b_u} \end{bmatrix}, \qquad (80)$$

where the $C_{\cdot,\cdot}$ are the position and bias covariances and cross covariances, given by $$C_{x_u,x_u} = (B^\top V B)^{-1} B^\top V \Sigma_\rho V B (B^\top V B)^{-1} \qquad (81)$$

$$C_{b_u,b_u} = \left\{1^\top \Sigma_\rho^{-1} 1 - 1^\top \Sigma_\rho^{-1} B (B^\top V B)^{-1} B^\top V \Sigma_\rho V B (B^\top V B)^{-1} B^\top \Sigma_\rho^{-1} 1\right\}^{-1} (82)$$

$$C_{x_u,b_u} = (B^\top V B)^{-1} B^\top V \Sigma_\rho V B (B^\top V B)^{-1} B^\top \Sigma_\rho 1 \big/ (1^\top \Sigma_\rho^{-1} 1), \qquad (83)$$

where the quantity $V$ is given by $$V = Z^\top A_D W A_D Z, \qquad (84)$$

and it was assummed that the weighting $W$ was symmetric. Note that this covariance reduces to the Fisher information matrix inverse above when the proper weighting $W = (A_D Z \Sigma_d Z^\top A_D)^{-1}$ is used.

If the proper weighting is used, the divide and conquer estimate covariance will also be given aproximately by the Fisher information matrix inverse above. The paper "A divide and conquer approach to least-squares estimation," *IEEE Trans. Aerosp. Elect. Sys.*, Vol. 26, No. 2, March 1990 gives the estimate covariance for the divide and conquer method when a general weighting is used.

A.5 Additional Bias Measurement

Modifications to the point estimation methods above to accomodate an additional bias measurement are described below. There are two methods, one is a divide and conquer approach which fixes up a pseudorange-based position-bias estimate, and the other is a modification to the equation error methods above.

First, if there are only three pseudoranges, take the bias estimate to be the measured bias, $$\hat{b}_u = \tilde{b}_u \qquad (85)$$

To find position, subtract the measured bias $\tilde{b}_u$ from the pseudoranges to form range measurements, and use standard ranging methods.

If the set of measured pseudoranges is sufficient to estimate position and bias, the divide and conquer method described in "A divide and conquer approach to least-squares estimation," *IEEE Trans. Aerosp. Elect. Sys.*, Vol. 26, No. 2, March 1990 may be used. The modified position and bias estimates are given by $$\begin{bmatrix} \hat{x}_u \\ \hat{b}_u \end{bmatrix} = (S^T W S)^{-1} S W \begin{bmatrix} x_u^* \\ b_u^* \\ \tilde{b}_u \end{bmatrix}, \qquad S = \begin{bmatrix} I \\ 0 & 1 \end{bmatrix}, \tag{86}$$

where $x_u^*$ and $b_u^*$ are the position and bias estimates based on the pseudorange measurements alone, and $W$ is a weighting matrix which, for minimum variance estimates, should be set to the inverse of the covariance of the "measurement vector"

$$\begin{bmatrix} x_u^* \\ b_u^* \\ \tilde{b}_u \end{bmatrix}. \tag{87}$$

For an arbitrary weighting, the covariance of the modified position and bias estimates is $$\mathrm{Var}\left\{\begin{bmatrix} \hat{x}_u \\ \hat{b}_u \end{bmatrix}\right\} = (S^T W S)^{-1} S^T W \Sigma W S (S^T W S)^{-1}, \tag{88}$$

$\Sigma$ being the "measurement vector" covariance.

To modify the equation error methods to accomodate an externally measured bias is simple. Note that by subtracting the measured bias $\tilde{b}_u$ from the first pseudorange, a measurement of the range to the first satellite is obtained. The equation $$(\tilde{\rho}_1 - \tilde{b}_u) - r_u = \epsilon_{EE1} \tag{89}$$

may be appended to the equation error (44) by appending the quantity $(\tilde{\rho}_1 - \tilde{b}_u)$ to the column matrix $\gamma$, and the row $[0 \ \ 1]$ to the matrix $\gamma$. (To keep all equation error components the same size, the new equation may be multiplied by a constant with magnitude comparable to that of the average intersatellite distance.)

There are now $n$ equations, and the weighting matrix used in $J_{RD}$ becomes an $n \times n$ matrix, modified in the obvious manner to accomodate the additional measurement. Note that modification to the equation error does not have any effect on the minimization problem, and therefore no modifications need be made to the minimization methods described above.

What is claimed is:

1. A two-stage filter for processing navigation data, including:
   a navigation processor for computing point position and/or bias estimates from input pseudorange data; and
   a smoothing filter for receiving and smoothing the point position and/or bias estimates output from the navigation processor.

2. The filter of claim 1, wherein the smoothing filter includes two separate filters for separately smoothing point position and bias estimates.

3. The filter of claim 1, wherein the smoothing filter smooths point position and bias estimates in parallel, in a manner in which cross-correlation between position and bias estimates is determined.

4. The filter of claim 1, wherein the smoothing filter is a constant-gain Kalman filter.

5. The filter of claim 1, wherein the smoothing filter is a time-varying-gain Kalman filter.

6. The filter of claim 1, wherein the smoothing filter is a linear smoothing filter.

7. The filter of claim 1, wherein the navigation processor receives and processes externally measured bias data, to improve quality of the point position and/or bias estimates.

8. The filter of claim 1, wherein the navigation processor computes measured bias data from the input pseudorange data, by filtering point bias estimates.

9. The filter of claim 1, wherein the navigation processor computes point position estimates based on pseudorange differences.

10. The filter of claim 1, wherein the navigation processor computes point position and/or bias estimates by minimizing or approximately minimizing a weighted norm of one of a pseudorange equation error and a pseudorange difference equation error.

11. The filter of claim 10, wherein the navigation processor performs approximate minimization using a divide and conquer method wherein estimates based on subsets of available pseudorange data are combined to form a unified estimate.

12. The filter of claim 10, wherein the navigation processor performs approximate minimization using a Lagrange multiplier technique wherein an optimum position is a function of a range parameter, wherein the range parameter satisfies a norm constraint.

13. The filter of claim 12, including means for computing the range parameter using a singular value decomposition method satisfying the norm constraint.

14. The filter of claim 1, wherein externally available point estimates of position, velocity, and/or acceleration coordinates are applied to the smoothing filter along with the navigation processor output to improve accuracy of the output of said smoothing filter.

15. The filter of claim 14, wherein the externally available point estimates are based on inertial navigation system data.

16. The filter of claim 14, wherein the externally available point estimates are based on LORAN time differences.

17. The filter of claim 14, wherein the externally available point estimates are based on transponder ranges.

18. The filter of claim 14, wherein the externally available point estimates are based on altimeter data.

19. The filter of claim 14, wherein the externally available point estimates are based on dead reckoning data.

20. The filter of claim 1, wherein the navigation processor receives and processes externally measured clock bias data to improve quality of the point position and/or bias estimates.

21. The filter of claim 20, wherein the externally measured clock bias data are formed by filtering point bias estimates computed from the input pseudorange data.

22. The filter of claim 20, wherein an externally measured position coordinate is used by the navigation processor to improve accuracy of the point position and/or bias estimates output from the navigation processor.

23. The filter of claim 22, wherein a gauge of the accuracy of a measured position coordinate is used to weight the contribution of the measured position coordinate to the point position and/or bias estimates.

24. The filter of claim 1, wherein available differential GPS corrections are used by the navigation processor to correct a pseudorange difference part of the pseudorange data.

25. The filter of claim 1, wherein the navigation processor computes estimates of covariance of the point position and/or bias estimates for use in the smoothing filter.

26. The filter of claim 1, wherein an externally available position coordinate is used to constrain the navigation processor output, thereby improving quality of the point position and/or bias estimates output from the navigation processor.

27. A two-stage filter for processing navigation data, including:
   a navigation processor for computing point position estimates from input range data; and
   a smoothing filter for receiving and smoothing the point position estimates output from the navigation processor.

28. A two-stage filter for processing navigation data, including:
   a navigation processor for computing point position estimates from input range difference data; and
   a smoothing filter for receiving and smoothing the point position estimates output from the navigation processor.

29. A method for processing navigation data, including the steps of:
   (a) computing point position and/or bias estimates from input pseudorange data; and
   (b) after step (a), smoothing the point position and/or bias estimates.

30. The method of claim 29, wherein step (b) includes the step of smoothing the point position and/or bias estimates in a Kalman filter.

31. The method of claim 29, wherein step (a) includes the step of approximately minimizing a weighted norm of one of a pseudorange equation error and a pseudorange difference equation error.

32. The method of claim 29, wherein step (a) includes the step of computing an estimate of covariance of the point position and/or bias estimates.

* * * * *